United States Patent Office 3,565,971
Patented Feb. 23, 1971

3,565,971
DIMERISATION OF OLEFINES
Roy John Sampson, David Jackson, and John Melvyn Thomas, Norton-on-Tees, England, assignors to Imperial Chemical Industries Limited, London, England, a corporation of Great Britain
No Drawing. Filed Apr. 10, 1968, Ser. No. 720,356
Claims priority, application Great Britain, Apr. 18, 1967, 17,780/67
Int. Cl. C07c 3/20
U.S. Cl. 260—683.15          3 Claims

ABSTRACT OF THE DISCLOSURE

Olefines are dimerised in the presence of a catalyst comprising a compound of nickel for example, nickel oxide, on a silica-magnesia support. The temperature is preferably 40° to 80° C.

---

This invention relates to the dimerisation of olefines.

Throughout this specification the phrase "dimerisation of olefines" is to be understood as including the co-dimerisation of different olefines.

It is known to dimerise olefines in the presence of a catalyst comprising nickel oxide on a silica-alumina support.

We have now found that if the alumina is replaced by magnesia a catalyst more selective for the dimerisation of olefines is obtained. Further, the relative rates of dimerisation of different olefines may be altered. Thus, for example, the rate of dimerisation of butene relative to that of propylene may be decreased by use of a nickel oxide on silica-magnesia catalyst.

According to the invention there is provided a process for the dimerisation of olefines in which an olefine is brought into contact with a catalyst comprising a compound of nickel on a support comprising silica and magnesia. The compound of nickel may for example, be the oxide, sulphate or halide, for example, the chloride. It is preferred that the compound of nickel is nickel oxide.

The proportion of nickel compound for example, nickel oxide, in the supported catalyst may vary from 1 to 50%, preferably 3 to 20%, by weight.

The magnesia content of the silica/magnesia support is preferably in the range 10 to 40% by weight of the support. The surface area of the support is preferably within the range 200 to 700 square metres per gram while the pore volume of the support should preferably be greater than 0.3 cc. per gram.

The support may contain a halide, preferably a chloride or fluoride, in an amount which may be in the range 0.5 to 5% by weight of the support.

The catalyst may be prepared by co-precipitating the nickel compound and the support or by impregnating the support with an aqueous solution of a nickel compound for example, nickel nitrate. The catalyst preparation must then be dried and calcined to give the finished catalyst. Drying may be effected in a current of hot air. Calcination should be carried out in dry air or an inert gas such as nitrogen. The calcination temperature is preferably within the range 350° to 650° C. The catalyst may be used in the form of pellets, extrusions, granules or powder.

The process of the invention is applicable to the dimerisation of a wide variety of olefines for example, ethylene, propylene and butenes.

The dimerisation process is preferably effected in a liquid phase which may be provided by the olefine to be dimerised or by a solvent for the olefine. Suitable solvents are paraffinic hydro-carbons or a product of the dimerisation process. Pressure may be applied to maintain a liquid phase.

The temperature at which the dimerisation process is carried out may be ambient or elevated temperature suitably up to about 140° C. It is preferably in the range 40° to 80° C.

The process may be operated batchwise or continuously with the catalyst in the form of a fixed bed or a suspension.

The catalyst may be regenerated by controlled reaction with an oxygen-containing gas at elevated temperature.

EXAMPLE 1

A nickel oxide on silica/magnesia catalyst was prepared as follows:

20 g. of a powdered silica/magnesia support containing by weight 27.5% magnesia, 68.8% silica and 3% fluorine and having a surface area of 500 square metres per gram and a pore volume of 0.7 cc. per gram, were slurried with 28 ml. water. The slurry was then shaken for one hour at room temperature with 55 ml. nickel nitrate solution containing 55 g. nickel nitrate hexahydrate. The solid was filtered off, dried in a current of dry air at 150° C. for 2 hours and calcined in a stream of air at 500° C. for 16 hours. The finished catalyst contained 14% by weight of nickel calculated as metal. Immediately before use the catalyst was finally calcined in air for 3 hours.

A known weight of the catalyst was placed in a 250 ml. autoclave, 200 ml. liquid propylene added and the dimerisation reaction allowed to proceed under autogenous pressure at 60° C. for a given time. The results of 3 experiments are given in the following table:

| Experiment No | 1 | 2 | 3 |
|---|---|---|---|
| Catalyst: | | | |
| Weight, gms | 2.52 | 2.45 | 2.52 |
| Final calcination Temp., °C | 500 | 350 | 500 |
| Reaction time, hours | 16 | 16 | 1 |
| Percent conversion propylene | 83 | 93 | 16 |
| Percent yield dimer | 69 | 66 | 88 |

EXAMPLE 2

A nickel oxide on silica/magnesia catalyst was prepared as described in Example 1 except that the amount of nickel nitrate used was adjusted to give a final catalyst containing 7% by weight of nickel.

The catalyst was finally calcined at 500° C. and used in the dimerisation of propylene at 60° C. as described in Example 1. The results of three experiments are given in the following table:

| Experiment No | 4 | 5 | 6 |
|---|---|---|---|
| Catalyst wt., gms | 2.57 | 2.56 | 2.50 |
| Reaction time, hours | 2 | 1 | 1 |
| Percent conversion propylene | 32 | 17 | 18 |
| Percent yield dimer | 86 | 90 | 87 |

EXAMPLE 3

In this example a nickel oxide on silica/alumina catalyst was used for comparison with the results obtained with a nickel oxide on silica/magnesia catalyst.

The catalyst was prepared by impregnating a silica/alumina support containing 25% by weight alumina with an aqueous solution of nickel nitrate, drying the impregnated support in a current of dry air and calcining it in air at 500° C. for 16 hours. The catalyst was then crushed and a fraction passing a 50 British Standard sieve and retained on a 200 British Standard sieve further calcined in air at 500° C. for 3 hours and used in the dimerisation of propylene at 60° C. as described in Example 1. The finished catalyst contained 3% by weight of nickel.

The results of 3 experiments are given in the following table:

| Experiment No | 7 | 8 | 9 |
|---|---|---|---|
| Catalyst wt., gms | 2.5 | 2.3 | 2.6 |
| Reaction time, hours | 0.5 | 2.0 | 6.0 |
| Percent conversion propylene | 17 | 34 | 63 |
| Percent yield dimer | 82 | 71 | 57 |

Comparison of these results with those given in Examples 1 and 2, particularly comparison of Experiments 4 and 8, shows that the silica/magnesia supported catalyst gives a higher yield of dimer at the same conversion than a silica/alumina supported catalyst.

EXAMPLE 4

A series of nickel oxide on silica/magnesia catalysts containing different proportions of nickel oxide was prepared by the following procedure:

50 grams of the powdered silica/magnesia support described in Example 1 were slurried with 70 ml. water and the slurry then shaken for 1 hour at room temperature with 137 ml. of an aqueous solution of nickel nitrate containing sufficient nickel nitrate to give the desired amount of nickel oxide in the finished catalyst. The slurry was then filtered, the remaining solid dried at 100° C. in a stream of dry air for 16 hours and then calcined at 500° C. for 24 hours.

Each catalyst was then used in the dimerisation of propylene as described in Example 1, the catalyst being re-calcined immediately before use at the temperatures and for the periods shown in the following table.

The results obtained were as follows:

| Experiment No | 10 | 11 | 12 | 13 |
|---|---|---|---|---|
| Percent Ni in catalyst, w./w | 1.5 | 2.4 | 3.3 | 5.3 |
| Catalyst wt. gms | 2.47 | 2.61 | 2.67 | 2.45 |
| Calcination temp., ° C | 500 | 500 | 520 | 520 |
| Calcination time, hours | 5 | 18 | 19 | 18.5 |
| Reaction time, hours | 4.2 | 2 | 2.1 | 1.5 |
| Percent conversion propylene | 22.4 | 15.4 | 17.9 | 21.5 |
| Percent yield dimer | 83 | 90 | 90 | 90 |

Comparison of these results with the results obtained in Experiment 3 of Example 1 and Experiments 5 and 6 of Example 2 shows that the yield of dimer at a given conversion of propylene does not vary very much with change in the nickel content of the catalyst provided that the nickel content exceeds about 1.5%.

EXAMPLE 5

In this example the catalyst of the invention is compared with a nickel oxide on silica/alumina catalyst in the dimerisation of a mixture of olefines containing 46.8% propylene, 12.5% trans-butene-2, 12.4% cis-butene-2 and 28.2% isobutene by weight.

The nickel oxide on silica/magnesia catalyst was made as described in Example 4 except that it was dried for 5 hours and calcined for 16 hours. It contained 7.2% nickel by weight.

The nickel oxide on silica/alumina catalyst which contained 10.1% nickel by weight, was made by impregnating ⅛ inch diameter silica/alumina extrusions (25% alumina by weight) with an aqueous solution of nickel nitrate, drying the impregnated support at 100° C. for 6 hours, calcining at 500° C. for 64 hours and crushing to pass a No. 50 British Standard sieve.

The dimerisation process was carried out as described in Example 1, the catalysts being re-calcined immediately before use at the temperatures and for the periods shown in the following table. The catalyst used in Experiments 14–16 was supported on silica/magnesia and that used in Experiments 17–20 was supported on silica/alumina.

The results obtained were as follows:

| Experiment No | 14 | 15 | 16 | 17 | 18 | 19 | 20 |
|---|---|---|---|---|---|---|---|
| Wt. of catalyst, gms | 2.53 | 2.67 | 2.49 | 2.67 | 2.72 | 2.71 | 2.67 |
| Calcination temperature, ° C | 510 | 510 | 500 | 500 | 500 | 500 | 500 |
| Calcination time, hours | 19.5 | 19.5 | 3.7 | 21.2 | 21.2 | 19.5 | 19.5 |
| Reaction time, hours | 2 | 2 | 16 | 2 | 2 | 1 | 1 |
| Percent conversion olefin | 35 | 43 | 75 | 57 | 57 | 58 | 61 |
| Percent yield of $C_6$, $C_7$ and $C_8$ dimer on olefin converted | 72 | 68 | 55 | 56 | 56 | 53 | 54 |
| Composition of dimer, w./w.: | | | | | | | |
| Percent hexenes | 53 | 52 | 51 | 55 | 55 | 56 | 57 |
| Percent heptenes | 15 | 17 | 20 | 16 | 18 | 16 | 19 |
| Percent octenes | 32 | 31 | 29 | 29 | 27 | 28 | 24 |

These experiments demonstrate that although the yield of dimer decreases with increasing conversion of olefine the yield of dimer at a conversion of 75% using the catalyst of the invention is substantially the same as the yield of a dimer at a much lower conversion (57 to 61%) when using a catalyst supported on silica/alumina.

EXAMPLE 6

In this example the catalyst of the invention is compared with a nickel oxide on silica/alumina catalyst in the continuous dimerisation of propylene.

The nickel oxide on silica/magnesia catalyst which contained 9% nickel by weight was prepared using the technique and support described in Example 1. It was pelleted to form pellets of 3/16 inch diameter and 3/16 inch height.

The nickel oxide on silica/alumina catalyst which contained 3.3% nickel by weight was prepared by impregnating ⅛ inch diameter extrusions of a silica/alumina support (25% by weight alumina, surface area 309 square metres per gram, pore volume 0.9 cc. per gram) with an aqueous solution of nickel nitrate, drying the impregnated support in a current of air and then calcining it in dry air at 500° C. for 16 hours. It was pelleted as described above.

The dimerisation process was carried out by packing the catalyst pellets into a reactor tube to form a fixed-bed of catalyst and passing liquid propylene through the tube under a pressure of 550 pounds per square inch gauge. The temperature of the catalyst bed was varied between 40° and 80° C. to vary the percentage conversion of propylene. In the experiments using a nickel oxide on silica/magnesia catalyst the space velocity of liquid propylene was in the range 2.5 to 5.9 litres per litre of catalyst filled space per hour while in the experiments using a nickel oxide on silica/alumina catalyst it was 4.

The results obtained were as follows:

Nickel oxide on silica/magnesia catalyst

| Percent conversion of propylene: | Percent yield of dimer |
|---|---|
| 45 | 65 |
| 40 | 69 |
| 38 | 70 |
| 36 | 72 |
| 34 | 73 |
| 32 | 74 |
| 27 | 78 |
| 24 | 80 |
| 23 | 79 |
| 18 | 79 |
| 17 | 86 |
| 14 | 88 |
| 12 | 83 |

Nickel oxide on silica/alumina catalyst

| Percent conversion of propylene: | Percent yield of dimer |
|---|---|
| 64 | 51 |
| 49 | 55 |
| 39 | 59 |
| 27 | 63 |
| 23 | 71 |

Comparison of these results shows that at any given conversion of propylene the yield of dimer is higher when the catalyst of the invention is used.

We claim:

1. A process for olefine dimerization or codimerization wherein an olefine feed comprising at least one olefine selected from the group consisting of propylene and the butenes is brought into contact, under conditions such that a liquid hydrocarbon phase is present and at a temperature in the range of from 40 to 140° C., with a catalyst consisting essentially of nickel oxide, halide or sulphate supported on silica-magnesia containing from 10 to 40% by weight magnesia, the nickel content of the catalyst being from 3 to 20% by weight calculated on the metal.

2. A process as claimed in claim 1 in which the nickel component of the catalyst is nickel oxide.

3. A process as claimed in claim 1, wherein the nickel component of the catalyst is introduced by impregnation of a preformed silica-magnesia support containing a minor proportion of fluoride and having a surface area of from 200 to 700 square meters per gram and a pore volume greater than 0.3 cubic centimeter per gram, and the reaction temperature is within the range of from 40 to 80° C.

References Cited
UNITED STATES PATENTS

| | | | |
|---|---|---|---|
| 3,113,166 | 12/1963 | Weesner | 260—683.15 |
| 3,332,989 | 7/1967 | Snyder et al. | 260—683.15X |
| 3,354,235 | 11/1967 | Hogan et al. | 260—683.15 |
| 3,442,964 | 5/1969 | Oldham | 260—683.15X |
| 3,442,965 | 5/1969 | Oldham | 260—683.15X |

PAUL M. COUGHLAN, JR., Primary Examiner

U.S. Cl. X.R.

252—441, 457